United States Patent
Goldstein

(10) Patent No.: US 11,721,102 B2
(45) Date of Patent: Aug. 8, 2023

(54) TENNIS INTEGRITY MATCH FIXING IDENTIFICATION SYSTEM

(71) Applicants: Group One Limited, Ramsey (GB); Fredric Goldstein, Nacka (SE)

(72) Inventor: Fredric Goldstein, Nacka (SE)

(73) Assignee: Group One Limited

( * ) Notice: Subject to any disclaimer, the term of this patent is extended or adjusted under 35 U.S.C. 154(b) by 77 days.

(21) Appl. No.: 17/428,055

(22) PCT Filed: Jan. 31, 2020

(86) PCT No.: PCT/US2020/016032
§ 371 (c)(1),
(2) Date: Aug. 3, 2021

(87) PCT Pub. No.: WO2020/163159
PCT Pub. Date: Aug. 13, 2020

(65) Prior Publication Data
US 2022/0148312 A1    May 12, 2022

Related U.S. Application Data

(60) Provisional application No. 62/801,995, filed on Feb. 6, 2019.

(51) Int. Cl.
*G06V 20/40* (2022.01)
*G06V 40/20* (2022.01)

(52) U.S. Cl.
CPC .............. *G06V 20/42* (2022.01); *G06V 20/44* (2022.01); *G06V 40/23* (2022.01)

(58) Field of Classification Search
CPC ......... G06V 20/42; G06V 40/23; G06V 20/44
See application file for complete search history.

(56) References Cited

U.S. PATENT DOCUMENTS

| | | | |
|---|---|---|---|
| 2004/0243261 A1 | 12/2004 | King | |
| 2011/0304497 A1* | 12/2011 | Molyneux | G01S 13/751 342/42 |
| 2016/0074739 A1 | 3/2016 | Pisupati et al. | |
| 2018/0322337 A1* | 11/2018 | Marty | G06T 7/20 |

OTHER PUBLICATIONS

Hatfield et al. "Forensic sports analytics: can we detect match-fixing in tennis?" STOR-i, Lancaster University, ATASS Sports. 2017.
Yong-wook e al. "Detection of possible match-fixing in tennis games." pp. 124-131. 2018.

* cited by examiner

*Primary Examiner* — David F Dunphy
(74) *Attorney, Agent, or Firm* — Carlson, Gaskey & Olds, P.C.

(57) ABSTRACT

A method of identifying fixing in a tennis match includes collecting one or more metrics related to a player in the tennis match using one or more computing devices, comparing the collected one or more metrics to one or more standards, and determining, based on the comparison using an algorithm that will identify a pattern or reoccurrence of unusual metrics, whether the player has deliberately lost one or more points in the tennis match.

20 Claims, 2 Drawing Sheets

TENNIS INTEGRITY MATCH FIXING IDENTIFICATION SYSTEM

CROSS-REFERENCED TO RELATED APPLICATION

This application claims priority to U.S. Provisional Application No. 62/801,995, which was filed on Feb. 6, 2019.

BACKGROUND

This disclosure relates to methods and systems for determining corruption in a sporting event, and more specifically to methods and systems for determining match fixing in the game of tennis.

The sport of tennis has a zero-tolerance policy on betting-related corruption. In some examples, corruption may include match fixing, where a player purposely loses or "throws" a point, set, and/or match. When a player throws a point or a set, it is more difficult to detect than when the player throws the entire match. Presently, steps are being taken to prevent corruption and to investigate potential corruption.

Such steps rely upon uncertain detection methods (unusual scores, unusual betting patterns that pay out, monitoring contacts between known fixers and players, etc). These steps are linear, rely in part upon third parties, i.e. not the governing bodies, and lack a more holistic lateral approach that comprises analyzing the metrics of a match and identifying via an algorithm unusual patterns and reoccurrences using modern technology.

It is not the role of betting companies to make judgments about corrupt activity. While one would expect betting companies to be self-motivated to flag suspicious bets, which allows them the chance to refuse to pay out, the onus still remains on the governing bodies themselves. Further, flagging unusual bets may lead to a suspicion but without providing any data as proof. All unusual bets need not be due to match fixing nor if they are, unusual bets by themselves often lack sufficient evidence for any taking any action. Taken alone, suspicious bets generally lack the probative value necessary to result in a conviction. Further evidence may be required, particularly evidence that corroborates the suspicion derived from unusual betting. Analysis of the play itself, which is within the total control of the player (where betting is not) would be more probative and in conjunction with the betting data, would greatly increase the chances of, firstly, an highly accurate identification of match-fixing and, secondly, the chances of obtaining a conviction in court with more evidence that additionally is directly indicative of intent (the core element of match fixing).

Upsets happen on a regular basis in tennis and are normally not indicative of any corruption. As such, this alone cannot be used as evidence, particularly if it is a singular occurrence which lacks any pattern or history. Similarly, equal ranked players are well able to fix a match, even if the odds may be less attractive, as the payout for a big upset of a higher ranked players can be very high, since such matches provide very high odds for the lower ranked player.

Further, players get injured and a higher rank player may lose to a much lower rank player due to injury, real or faked, without triggering suspicion.

Therefore, more advanced means should be used in order to identify corruption.

The background description provided herein is for the purpose of generally presenting a context of this disclosure. Subject matter disclosed, to the extent it is described in this background section, as well as aspects of the description that may not otherwise qualify as prior art at the time of filing, are neither expressly nor impliedly admitted as prior art against the present disclosure.

SUMMARY

A method of identifying fixing in a tennis match, according to an example of this disclosure, includes collecting one or more metrics related to a player in the tennis match using one or more computing devices, comparing the collected one or more metrics to one or more standards, and determining, based on the comparison using an algorithm that will identify a pattern or reoccurrence of unusual metrics, whether the player has deliberately lost one or more points in the tennis match.

In a further example of the foregoing, the standard includes a threshold value of a comparable one of the one or more metrics, which may identify a pattern of unusual statistics.

In a further example of any of the foregoing, one or more metrics include a margin of a miss, such that a pattern emerges of unusual misses that indicates a deliberate loss of a point, game, set, or match.

In a further example of any of the foregoing, the standard includes a movement pattern.

In a further example of any of the foregoing, the algorithm includes an analysis of the reaction time of the players.

In a further example of any of the foregoing, the one or more metrics include a number of unforced errors by the higher ranked player.

In a further example of any of the foregoing, the one or more metrics include a number of unforced errors by the higher ranked player.

In a further example of any of the foregoing, one or more metrics include a number of double faults.

In a further example of any of the foregoing, one or more metrics include a number of break points by higher ranked player that were not converted.

In a further example of any of the foregoing, one or more metrics include a number of break points lost by higher ranked player.

In a further example of any of the foregoing, one or more metrics include a number of break points won by lower ranked player.

In a further example of any of the foregoing, one or more metrics include a number of poor returns by higher ranked player.

In a further example of any of the foregoing, one or more metrics include a number of service games won by lower ranked player.

In a further example of any of the foregoing, one or more metrics include a movement of the player.

In a further example of any of the foregoing, one or more metrics include a number of loose ground strokes that sit up for easy winner.

In a further example of any of the foregoing, one or more metrics include a number of winners for the lower ranked player.

In a further example of any of the foregoing, the speed of ground strokes or serves indicates an unusual pattern.

In a further example of any of the foregoing, the position a player takes during a service return or rally indicates an unusual pattern.

A system according to an example of this disclosure includes a device which measures and collects aspects of play during a tennis match. The aspects include metrics of the ball impact on the court. The device is programmable with an algorithm, which discloses when the reoccurrence or pattern of the ball impacts at least one of outside the lines or into the net is indicative of deliberate misses.

In a further example of the foregoing, the system includes metrics of player movement and position on court during a point. The algorithm identifies unusual behavior.

DETAILED DESCRIPTION

Figure 1:
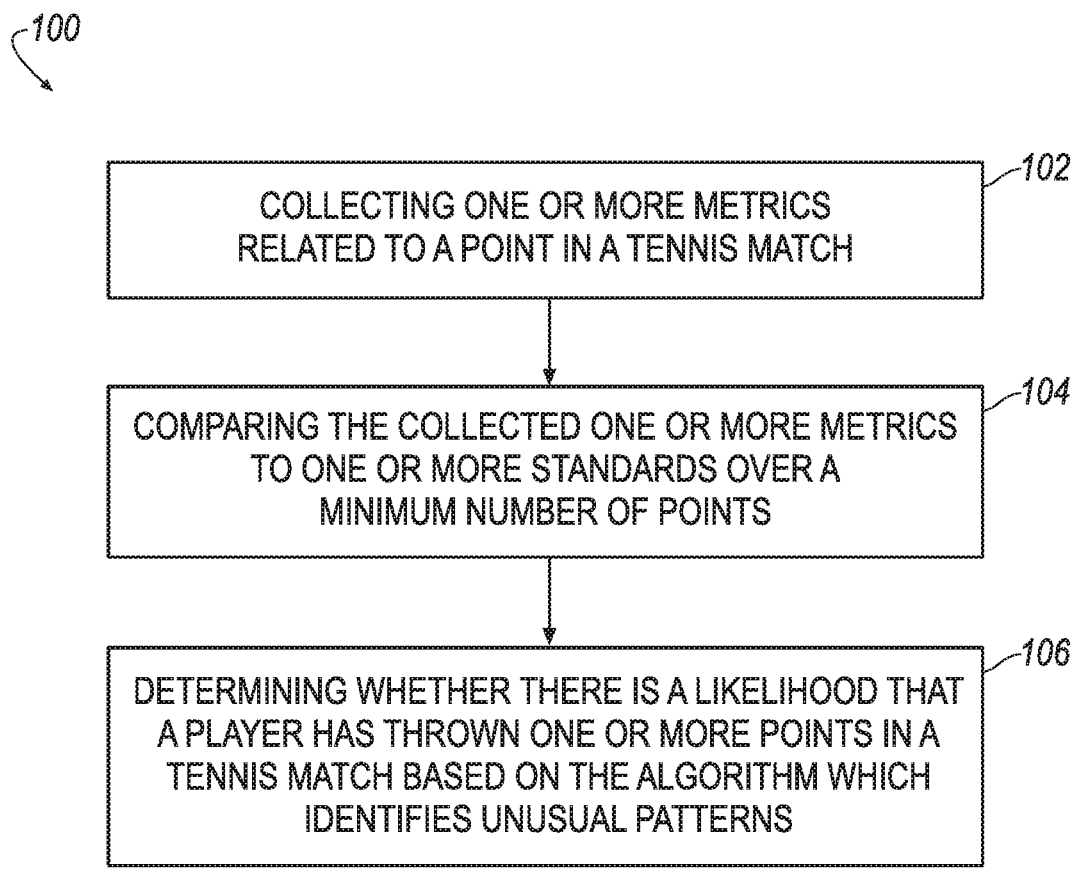
FIG. 1 illustrates a flow chart of an example method for determining whether one or more points are thrown in a tennis match.

FIG. 1 illustrates a flow chart of an example method 100 for determining whether a player has thrown one or more points in a tennis match. At step 102, one or more metrics related to a point in a tennis match is collected.

In some examples, the one or more metrics may include player ranking in combination with other data, such as: number of unforced errors by the higher ranked player; margin of a miss (e.g., distance outside the lines or distance from the top of the net); number of loose ground strokes that sit up for easy winner; number of winners for the lower ranked player; number of double faults; number of poor returns by the higher ranked player; the number of service games won by lower ranked player; number of break points by the higher ranked player; number of break points lost by the higher ranked player; number of break points won by the lower ranked player; movement by a player (e.g., the player is several steps behind getting to a relatively straight forward shot in a rally)).

In some examples, the disclosed systems and methods may work without existing players' individual databases in analyzing play, since what is not available in an existing benchmark relative to, for example, the player's current (or historic) ranking, can be filled in by the system "learning" during the match and/or other matches. Where this is utilized, the probative value of the analysis as evidence may be reduced in terms of its statistic probability, but for an alert to be generated it will still function in tandem with other match fixing monitoring, such as the highly developed analysis of betting patterns. An alert from the instant system could motivate a closer look at the bettor patterns in that particular match, while similarly, an alert generated from unusual betting patterns would precipitate a closer look at the match data and analysis from the instant system. These dual forensic analyses in tandem may provide an excellent synergy in identifying suspect play.

Figure 2:
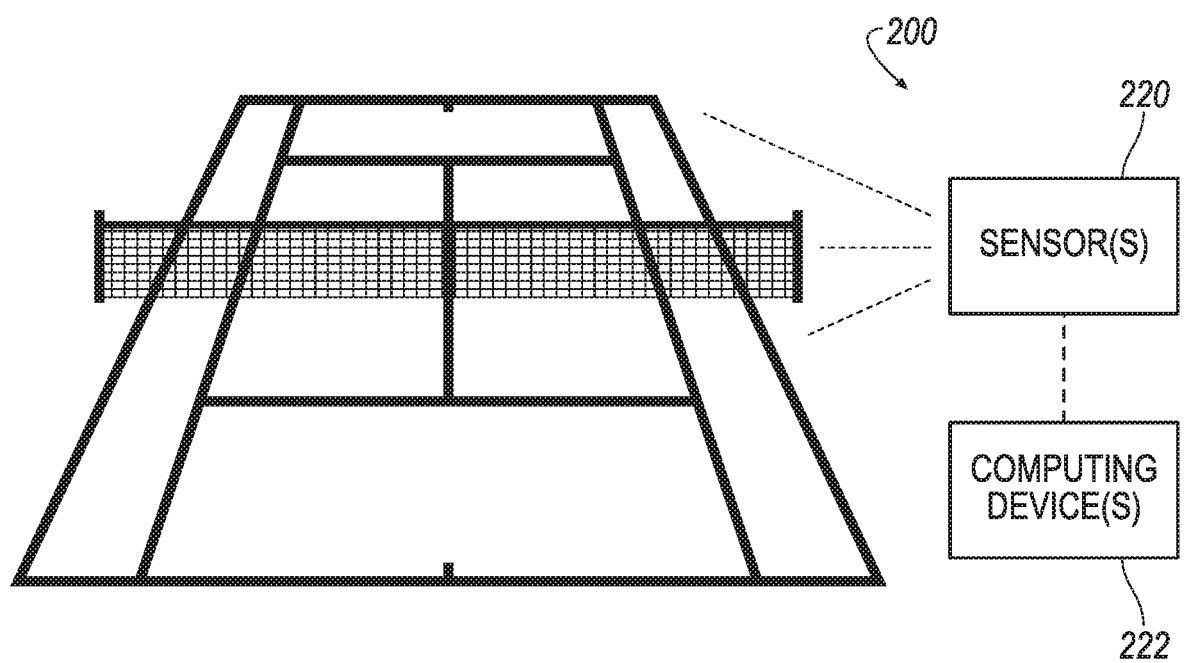
FIG. 2 schematically illustrates an example system for determining whether one or more points are thrown in a tennis match.

In some examples, referring to the schematic illustration of the example system 200 shown in FIG. 2, step 102 is performed using one or more sensors 220 and the data is stored and processed on one or more computing devices 222. In some examples, the sensor 220 is an image capture unit. In some examples, computing devices 222 may include servers, desktop computers, laptop computers, tablets, and/or smartphones. In some examples, a computing device 222 may be integrated with an image capture unit. Reference to "computing devices" also includes a reference to a network of computing devices. The example one or more computing devices 22 may be programmable to execute one or more of the methods or processes disclosed.

At step 104, the metric collected from step 102 is compared to one or more standards, such as a threshold value or a standard movement pattern. The standard may be an associated average or standard of the comparable collected metric. In some examples, threshold values or standards may be set based on data for the player in other sets of the match or in other matches of that season. In some examples, threshold values or standards may be set based on data of other players within a field. The metrics may be weighted based on the relative rankings of the players in the match.

In some examples, a threshold value may be: an average number of unforced errors; an average margin of a miss; an average number of double faults; an average number of break points by higher ranked player; an average number of poor returns by the higher ranked player; an average number of service games won by lower ranked player; an average number of break points lost by higher ranked player; number of break points won by lower ranked player; an average number of loose ground strokes that sit up for easy winner; an average number of winners for the lower ranked player. In some examples, a standard movement pattern may include a movement pattern by a player in response to a similar shot during other sets or matches. The standard movement patterns may be set and then adjusted over time. In some examples, artificial intelligence, machine learning, and/or neural networks may be utilized.

Step 104 may be performed with the same computing devices used for step 102, and/or with one or more separate computing devices. In some examples, steps 102 and 104 may be repeated several times throughout a set and/or a match.

At 106, the method includes determining whether there is a likelihood that a player has thrown one or more points in a tennis match based on the comparison(s) made in step 104. For example, if there are one or more discrepancies between the collected metrics and the standards, and/or there are patterns which are unusual, there may be a likelihood that the player has thrown one or more points. The term "determining," as used herein, may be an indication of a likelihood that the player has thrown one or more points in the tennis match. One may use the output of step 106 to decide whether to investigate the potential for fixing further.

The output of the "determining" step could be one or more of a single point, the score in the game, and the score of a particular set, and the higher the likelihood of the player throwing the one or more points, the greater the anomaly in the score. A threshold may be set in an algorithm to alert or flag matches where one or more points has a score above the threshold so that one can investigate further. Even when a match has been won by a player, he or she may have been involved in corruption by losing particular points, games or sets, all of which may be bet upon by those involved in the fix. This algorithm could therefore identify fixing even in matches where the result is commensurate with the rankings of the players. And players of equal rank may still fix a match, even if the betting odds may not provide a great return.

In some examples, steps 104 and 106 may be completed by an algorithm programmed into one or more computing devices. For example, if a collected metric is a certain number or percentage away from a threshold value, it may indicate a likelihood that a player is throwing one or more points. Again, as in step 104, in step 106 artificial intelligence, machine learning, and/or neural networks may be utilized.

The term "algorithm" as used herein may broadly include simple algorithms and/or more complex types, such as machine learning and/or artificial intelligence ("AI"). The latter type of algorithm may be employed where an existing database for the analysis of an individual players is non-existent or not available, so as to then provide a spontaneous benchmark of metrics for which the algorithm will work to identify anomalies.

For example, one or more significant miss margins may be indicative of a player throwing points. If a player is intending to miss, it is not easy for that player to miss by close margins on a consistent basis. Instead, if a player were intending to lose a point, the player would likely miss by a wide margin. In order to be sure to miss, therefore, the player may aim a particular distance outside the lines. The risk otherwise could be winning a point that he must lose. Therefore, if a player hits one or more shots well beyond the lines or well below the top of the net, there may be an increased likelihood that the player was throwing that particular point, set, match, etc. The algorithm may calculate one or more of multiple factors, such as the importance of the point, such as if going for or protecting a break point, set point, or even match point, type of shot, court position, quality of the stroke coming from the opposing player, etc. While in some matches, there is little or no existing database for an individual player, existing benchmarks in tennis, as well as other factors, such as the ranking of the player, the tour within which the tournament is played (i.e. ATP/WTA/GS tours or lower level Challenger or Futures Tours), if a qualifying round, etc., will inherently constitute a general benchmark sufficient enough towards identifying unusual play. Comparing any such match play alerts with any unusual betting patterns will create a synergy of two independent forensic tools in building a case. It is also possible to continue the evaluation if the same player goes deep into the tournament, thus the final analysis may be withheld pending additional information on matches during the same event or within the immediate future.

It will be noted that absent suspect betting patterns, poor play during any particular point or match may instead merely be an officiating violation, i.e. lack of best effort (a player code of conduct violation), as opposed to a TIU violation, in some examples.

The algorithm may include further analysis between the match data forensics and the betting pattern data such that any correlation between the two may be effectively and efficiently identified and/or anticipated for more targeted and tailored search parameters.

In another example, unusual movement by a player may reveal a likelihood that the player is throwing a particular point, set, match, or even attempting to construct a corrupt scoreline. As one example, the player may hit an inside out forehand shot but remain planted on that extreme side of the court, leaving an open court for an easy winner. In another example, the player may be late getting to drop shots. In another example, the player may be late peddling back to get a lob. Any one of these movements could be compared to standards for the player or other players, and if a discrepancy is detected, may indicate a likelihood that a player is throwing one or more points. In some examples, the degree of the anomaly, a repetition of the anomaly, the type of anomaly, and even the conditions at the time of the anomaly (e.g. early or late in the match, during or directly after a very long rally, heat index, etc) are all factors that may be evaluated and considered in providing a statistical probability that any particular characteristic of the stroke or point may have indicated a deliberate loss.

In some examples, a high number of unforced errors by the higher ranked player may indicate a likelihood that a player is throwing one or more points. In some examples, one or more loose ground strokes that sit up for easy winner may indicate a likelihood that a player is throwing one or more points. In some examples, a high number of winners for the lower ranked player may indicate a likelihood that the higher ranked player is throwing one or more points. In some examples, a high number of double faults may indicate a likelihood that a player is throwing one or more points. In some examples, a high number of poor returns by higher ranked player coupled with a high number of service games won by lower ranked player may indicate a likelihood that the higher ranked player is throwing one or more points. In some examples, a low number of break points by higher ranked player may indicate a likelihood that the higher ranked player is throwing one or more points. In some examples, a low number of break points lost by higher ranked player may indicate a likelihood that the higher ranked player is throwing one or more points. In some examples, a high number of break points won by lower ranked player may indicate a likelihood that the higher ranked player is throwing one or more points.

As another example, a player's choice of a type of shot may be considered. For example, a player could "throw" a point despite trying to make the shot by virtue of his choice of shots on any given point. A specific poor choice of shot, particularly on an important point, could be indicative of an intentional loss of point. As one example, a cross court shot hit to a player's backhand often results in a corresponding return stroke in the same direction. To however hit such a shot down the line is one of the hardest strokes in tennis and statistically likely to fail even in practice, much less under the pressure of a match. Thus, a player could lose a point, a game, or even a set (and thus a match) solely by poorly choosing difficult and unnecessarily high risk shots that would more likely lead to a loss of the point, even if he were to try his best to make that shot. And even were he to make that shot, but did not try to recover his position to the center of the court, the return shot would likely lead to a winner by his opponent. A player who virtually never attempts or succeeds in a particular shot or strategy (i.e. rushing the net) would raise suspicions were he to suddenly go for such a tactic, such as on critical points in a match. While even the best players can fail at times to choose the optimum strategy and tactics, and recklessly go for winners from poor court positions, a consistent loss of critical points due to such shots, while in of itself not indicative of a deliberate loss, may contribute to generating an alert to monitor the corresponding betting patterns during those particular points in some examples.

Even such shots attempted on non-critical points in a game or match may be monitored in some examples, given that betting can occur on the outcome of even a single point, irrespective of where in the match that point is played.

In some examples, break points—when the player is one point away from winning a game while the opponent serves—may be analyzed in higher priority than other points.

In some example cases that are built upon multiple evidence, the disclosed systems and methods serve as an forensic addition tool.

In some examples, a system for identifying fixing in a tennis match under this disclosure could be said to include a device which measures and collects aspects of play during a tennis match, the aspects including metrics of a ball impact on a court. The device may be programmable with an algorithm which discloses when the reoccurrence or pattern of the ball impacts outside the lines or into the net is collectively indicative of deliberate misses.

Although the different embodiments are illustrated as having specific components, the embodiments of this disclosure are not limited to those particular combinations. It is possible to use some of the components or features from any of the embodiments in combination with features or components from any of the other embodiments. Modern technology makes equipment that provides these metrics cost effective, which is particularly important on the lower tier tours where main tour tournament facilities are not available (i.e. the electronic line calling, known as ELC, is never available on these events). Therefore, such information is now able to be readily collected and using the appropriate algorithm, identify match fixing on an entirely new level. The foregoing description shall be interpreted as illustrative. A worker of ordinary skill in the art would understand that certain modifications could come within the scope of this disclosure. Various examples of the disclosure have been described. Any combination of the described systems, operations, or functions is contemplated. It is possible to use some of the components or features from any of the examples in combination with features or components from any of the other examples. These and other examples are within the scope of the following claims.

What is claimed is:

1. A method of identifying fixing in a tennis match, the method comprising:
collecting one or more metrics related to a player in the tennis match using data from one or more computing devices;
comparing the collected one or more metrics to one or more standards; and
determining, based on the comparison using an algorithm that will identify a pattern or reoccurrence of unusual metrics, whether the player has deliberately lost one or more points in the tennis match, wherein the one or more metrics includes at least one of the following: (a) a number of unforced errors by the higher ranked player, (b) a number of double faults, (c) a number of break points by higher ranked player that were not converted, (d) a number of break points lost by higher ranked player, (e) a number of break points won by lower ranked player, (f) a number of poor returns by higher ranked player, (g) a number of service games won by lower ranked player, (h) a number of loose ground strokes that sit up for easy winner, (i) a number of winners for the lower ranked player, (j) the speed of ground strokes or serves, and (k) the position a player takes during a service return or rally.

2. The method as recited in claim 1, wherein the standard includes a threshold value of a comparable one of the one or more metrics which may identify a pattern of unusual statistics.

3. The method as recited in claim 1, wherein the one or more metrics include a margin of a miss, such that a pattern emerges of any number of unusual misses that indicates a deliberate loss of a point, game, set, or match.

4. The method as recited in claim 1, wherein the standard includes a movement pattern.

5. The method as recited in claim 1, wherein the algorithm includes an analysis of the reaction time of the players.

6. The method as recited in claim 1, wherein the one or more metrics include a number of unforced errors by the higher ranked player.

7. The method as recited in claim 1, wherein the one or more metrics include a number of double faults.

8. The method as recited in claim 1, wherein the one or more metrics includes a number of break points by higher ranked player that were not converted.

9. The method as recited in claim 1, wherein the one or more metrics includes a number of break points lost by higher ranked player.

10. The method as recited in claim 1, wherein the one or more metrics includes a number of break points won by lower ranked player.

11. The method as recited in claim 1, wherein the one or more metrics includes a number of poor returns by higher ranked player.

12. The method as recited in claim 1, wherein the one or more metrics includes a number of service games won by lower ranked player.

13. The method as recited in claim 1, wherein the one or more metrics includes a movement of the player.

14. The method as recited in claim 1, wherein the one or more metrics includes a number of loose ground strokes that sit up for easy winner.

15. The method as recited in claim 1, wherein the one or more metrics includes a number of winners for the lower ranked player.

16. The method as recited in claim 1, wherein the speed of ground strokes or serves indicates an unusual pattern.

17. The method as recited in claim 1, wherein the position a player takes during a service return or rally indicates an unusual pattern.

18. The method as recited in claim 1, wherein the one or more metrics includes at least two of the following: (a) a number of unforced errors by the higher ranked player, (b) a number of double faults, (c) a number of break points by higher ranked player that were not converted, (d) a number of break points lost by higher ranked player, (e) a number of break points won by lower ranked player, (f) a number of poor returns by higher ranked player, (g) a number of service games won by lower ranked player, (h) a number of loose ground strokes that sit up for easy winner, (i) a number of winners for the lower ranked player, (j) the speed of ground strokes or serves, and (k) the position a player takes during a service return or rally.

19. The method as recited in claim 1, wherein the one or more metrics includes at least three of the following: (a) a number of unforced errors by the higher ranked player, (b) a number of double faults, (c) a number of break points by higher ranked player that were not converted, (d) a number of break points lost by higher ranked player, (e) a number of break points won by lower ranked player, (f) a number of poor returns by higher ranked player, (g) a number of service games won by lower ranked player, (h) a number of loose ground strokes that sit up for easy winner, (i) a number of winners for the lower ranked player, (j) the speed of ground strokes or serves, and (k) the position a player takes during a service return or rally.

20. The method as recited in claim 1, wherein the one or more metrics includes at least four of the following: (a) a number of unforced errors by the higher ranked player, (b) a number of double faults, (c) a number of break points by higher ranked player that were not converted, (d) a number of break points lost by higher ranked player, (e) a number of break points won by lower ranked player, (f) a number of poor returns by higher ranked player, (g) a number of service games won by lower ranked player, (h) a number of loose ground strokes that sit up for easy winner, (i) a number of winners for the lower ranked player, (j) the speed of ground strokes or serves, and (k) the position a player takes during a service return or rally.

\* \* \* \* \*